United States Patent
Khandani

(10) Patent No.: US 9,008,208 B2
(45) Date of Patent: Apr. 14, 2015

(54) WIRELESS TRANSMISSION WITH CHANNEL STATE PERTURBATION

(71) Applicant: Amir Keyvan Khandani, Kitchener (CA)

(72) Inventor: Amir Keyvan Khandani, Kitchener (CA)

(*) Notice: Subject to any disclaimer, the term of this patent is extended or adjusted under 35 U.S.C. 154(b) by 0 days.

(21) Appl. No.: 13/893,296

(22) Filed: May 13, 2013

(65) Prior Publication Data
US 2013/0301747 A1  Nov. 14, 2013

Related U.S. Application Data

(60) Provisional application No. 61/646,312, filed on May 13, 2012, provisional application No. 61/771,815, filed on Mar. 2, 2013.

(51) Int. Cl.
| | |
|---|---|
| H04B 7/02 | (2006.01) |
| H04W 16/14 | (2009.01) |
| H04B 7/04 | (2006.01) |
| H04L 5/14 | (2006.01) |
| H04W 12/04 | (2009.01) |
| H04B 7/06 | (2006.01) |
| H04B 7/10 | (2006.01) |

(52) U.S. Cl.
CPC ............ *H04W 16/14* (2013.01); *H04B 7/0413* (2013.01); *H04L 5/14* (2013.01); *H04W 12/04* (2013.01); *H04B 7/0478* (2013.01); *H04B 7/026* (2013.01); *H04B 7/0417* (2013.01); *H04B 7/0626* (2013.01); *H04B 7/10* (2013.01)

(58) Field of Classification Search
USPC ........................................ 375/267, 295, 299
See application file for complete search history.

(56) References Cited

U.S. PATENT DOCUMENTS

| | | | |
|---|---|---|---|
| 5,388,124 A | 2/1995 | Laroia et al. | |
| 2001/0010495 A1 | 8/2001 | Helms et al. | |
| 2008/0233966 A1 | 9/2008 | Scheim et al. | |
| 2010/0003931 A1 | 1/2010 | Krishnan et al. | |
| 2011/0110451 A1 | 5/2011 | Tsai et al. | |
| 2011/0268100 A1 | 11/2011 | Gorokhov et al. | |
| 2012/0027113 A1 | 2/2012 | Gaal et al. | |
| 2013/0077705 A1* | 3/2013 | Thomas et al. | 375/295 |
| 2014/0056379 A1* | 2/2014 | Jongren et al. | 375/267 |
| 2014/0093004 A1* | 4/2014 | Gomadam et al. | 375/267 |

FOREIGN PATENT DOCUMENTS

WO   2011098975   8/2011

OTHER PUBLICATIONS

International Search Report for PCT/US2013/040820 mailed Feb. 10, 2014.
Written Opinion for PCT/US2013/040820 mailed Feb. 10, 2014.

* cited by examiner

*Primary Examiner* — Don N Vo
(74) *Attorney, Agent, or Firm* — Invention Mine LLC

(57) ABSTRACT

Generating a channel codebook by identifying a subset of antenna configurations from a plurality of antenna configurations of an antenna associated with a transmitter by: transmitting a sequence of symbols from the transmitter to a receiver using the plurality of antenna configurations, wherein each antenna configuration provides a unique transmission characteristic to the receiver; receiving feedback from the receiver that identifies the subset of antenna configurations; and, generating channel codebook entries corresponding to the subset of antenna configurations; and, transmitting data from the transmitter to the receiver using the channel codebook.

20 Claims, 18 Drawing Sheets

WIRELESS TRANSMISSION WITH CHANNEL STATE PERTURBATION

CROSS-REFERENCE TO RELATED APPLICATIONS

The present application is a non-provisional filing of, and claims benefit under 35 U.S.C. §119(e) from, U.S. Provisional Patent Application Ser. No. 61/646,312, filed May 13, 2012, and U.S. Provisional Patent Application Ser. No. 61/771,815, filed Mar. 2, 2013, both of which are hereby incorporated herein by reference. In addition, this application is related to the following applications, all of which are also incorporated herein by reference: U.S. application Ser. No. 13/893,288, entitled Full Duplex Wireless Transmission with Self-Interference Cancellation, filed May 13, 2013, U.S. application Ser. No. 13/893,297, entitled Full Duplex Wireless Transmission with Channel Phase-Based Encryption, filed May 13, 2013, and U.S. application Ser. No. 13/893,299, entitled Distributed Collaborative Signaling in Full Duplex Wireless Transceivers, filed May 13, 2013.

BACKGROUND OF THE INVENTION

Current wireless systems are based on embedding information in variations from a source (transmitter) to be sent, using an antenna, through a static or slowly varying wireless channel to a destination (receiver). It is also desirable to have high spectral efficiency, and low probability of error (outage). Wireless systems suffer from fading caused by multipath Radio Frequency (RF) wave propagation. Diversity can be used to combat the effect of multi-path fading.

Multiple-Input Multiple-Output (MIMO) antenna systems are used as a way in which to realize diversity or increase spectral efficiency in wireless systems. In particular, spectral efficiency of a M×N MIMO system scales with the multiplexing gain which is min(M, N), (i.e., smaller of M and N). In addition, to reduce the effect of multipath fading, a system can be configured to tradeoff multiplexing gain against diversity order.

Thus, there are advantages in having a wireless system that offers the benefits of MIMO systems in terms of spectral efficiency and diversity with a smaller number of antennas.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
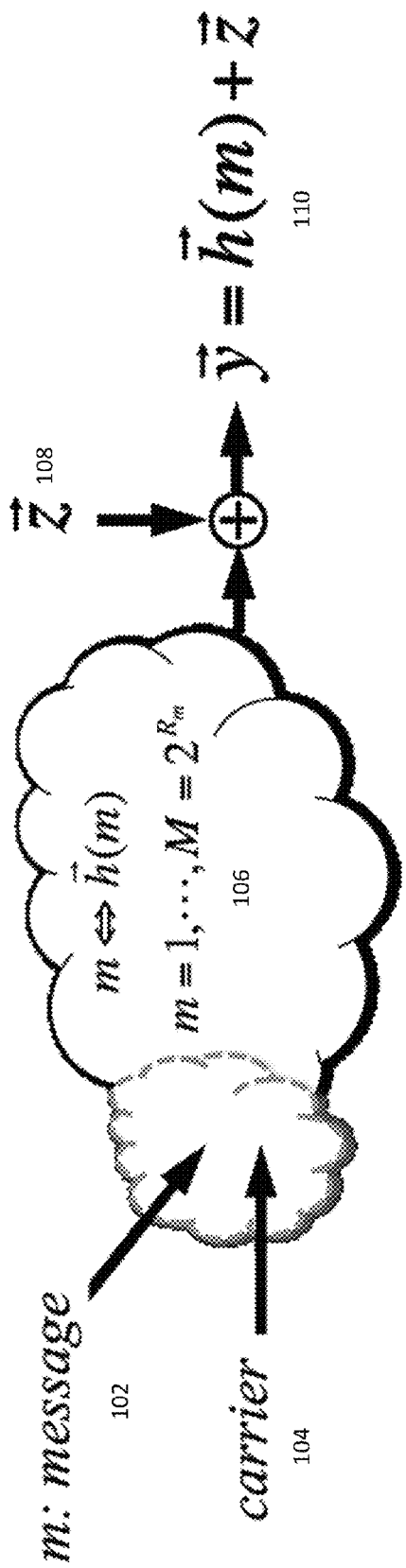
FIGS. 1-2 show a functional block diagram of an embodiment of a system for wirelessly transmitting data using channel perturbation.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Described herein are systems and methods of channel perturbation modulation. In one embodiment, a method comprises: generating a channel codebook by identifying a subset of antenna configurations from a plurality of antenna configurations of an antenna associated with a transmitter by: (i) transmitting a sequence of symbols from the transmitter to a receiver using the plurality of antenna configurations, wherein each antenna configuration provides a unique transmission characteristic to the receiver; (ii) receiving feedback from the receiver that identifies the subset of antenna configurations; and, (iii) generating channel codebook entries corresponding to the subset of antenna configurations; and then transmitting data from the transmitter to the receiver using the channel codebook.

In a further embodiment, an apparatus comprises: a transmitter having a source codebook with a plurality of source codewords and a channel codebook with a plurality of channel codewords, wherein each channel codeword corresponds to a respective antenna configuration from a plurality of antenna configurations, the transmitter configured to use data bits to select a source codeword and to select a channel codeword; at least one transmit antenna used by the transmitter; and, a plurality of reflectors positioned around the at least one transmit antenna wherein the reflectors are configured to be individually turned on or off according to the selected channel codeword to provide the plurality of antenna configurations.

Figure 2:
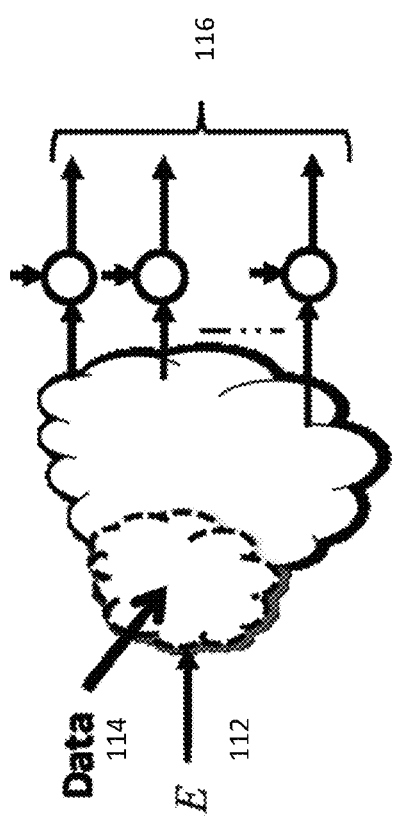

FIGS. 1-2 show a functional block diagram of an embodiment of a system for wirelessly transmitting data using channel perturbation. In the embodiment shown in FIG. 1, a message signal m 102 may carry data from a transmitter to a receiver over a wireless channel. The message signal m 102 is modulated onto a carrier signal 104 which in turn is transmitted over the channel to a receiver. That is, the message m is modulated onto the carrier signal using channel perturbation techniques described in the present disclosure. The modulation of the message signal onto the carrier signal can be designated as a vector function h(m) 106. Each vector may correspond to a channel state. The channel may also introduce noise and other spurious signals represented by the vector function z 108. Thus, the received signal y 110 may be the combination of the modulated message signal h(m) 106 and the noise z 108.

FIG. 2 shows a functional block diagram of an embodiment of a system for wirelessly transmitting data using channel perturbation. A carrier signal may have an Energy E 112. Further, data 114 may be modulated on such a carrier signal using channel perturbation techniques resulting in an information signal transmitted using one transmit antenna. A receiver may have N receive antennas to receive the information signal 116. Such an information signal 116 may have a total signal energy DE where D is the complex receive dimensions (note there is on complex transmit dimension). The basis for the information signal 116 is orthogonal due to the independent noise from the wireless channel.

In a traditional SIMO system, as shown in FIG. 2, with one transmit and N receive antennas, the received N-dimension vector spans a one-dimensional space. As a result, the best strategy is to save energy by the combining the signals of different received antennas (maximum-ratio combining). This results in a saving in energy that increases linearly with N. However, the channel is changed using the methods herein described, the N-dimensional vector received across receive antennas, may not be confined to a single dimension any longer. This results in a full-rank constellation over the receive antennas. In addition, the additive Gaussian noise remains independent over the dimensions corresponding to receive antennas. This avoids the performance loss due to non-orthogonality of the channel matrix that causes an inherent energy loss in conventional MIMO systems. Due to this full-rank property, the rate that can be embedded in the channel constellation (for a given energy of RF source) grows linearly with N. This is similar to the phenomenon occurring in conventional N×N MIMO causing the achievable rate to increase linearly with N. Methods of this described herein for a 1×N M-SIMO offer two other advantages with respect to a conventional N×N MIMO: 1) Possibility of selecting a subset of channel states (using channel perturbation) can result in a significant saving in energy, particularly if the overall target rate is relatively small compared to the available number of channel configurations (rate/dimension is small). 2) Equivalent channel matrix is diagonal with diagonal elements corresponding to the fading gain form the transmit antenna to each of the receive antennas. Although the elements of the channel codebook can be freely selected, there is no control over the individual components of the corresponding vector. This feature should be accounted for in the corresponding detection algorithm and may result in an increase in complexity, however a similar phenomenon occurs in conventional MIMO. Overall, the benefits due to the above features can result in a significant saving in energy (for a given target rate and outage probability) as compared to conventional N×N MIMO.

In the systems described herein, information such as message signal m 102 is embedded in variations applied to the channel state (e.g. phase, magnitude and/or polarization) as well as in variations applied to the source being transmitted.

Channel perturbation can be achieved by changing parameters that affect propagation of the RF signal. A channel codebook comprising a set of channel states may be defined. A channel perturbation technique changes the parameters that affect the propogation of the RF signal according to the set of channel states. In addition to the channel codebook, a source that can be varied to transmit information (a source codebook) using conventional modulation techniques. Thus the information-bearing signal transmitted over the air is composed of two inputs, an element of each codebook. The output (at the receiver) is a combination of the two inputs plus additive white Gaussian noise.

In an embodiment, a transmitter may send symbols over a time period T. Further, the transmission over a channel may have an impulse response of length L. Thus, the channel impulse response has a time duration of LT. In such an embodiment, the channel is changed in each time slot according to the channel states of the channel codebook.

A receiver, (during a training phase), may learn the channel states and feedback a selection of the channel states, or a subset of all the possible states, with which to define a subset of the channel codebook for use by a transmitter. Selection may be responsive to transmission features such as less transmit energy requirements. Following the training in normal transmission, the transmitter may select an element of the selected subset of the channel codebook to embed information while the source varies to embed further information. The variation of the channel does not cause a usual increase in transmit energy while it results in additional constellation points at the receiver. The present disclosure describes a paradigm in wireless communications based on changing the transmission channel (media-based communications).

Thus, such "media-based" communications includes the ability to change the transmission channel. This can be achieved by changing the propagation environment around transmitter, for example through changing the reflections of the Radio Frequency (RF) signal from near-by objects, or changing other RF characteristics of the environment with particular emphasis on varying the phase, and/or polarization. In some embodiments, the system creates multiple independent options for the underlying multi-path channel. This is significantly easier as compared to traditional antenna beamforming as in a rich scattering environment, because a small perturbation in the channel interacts with many reflections from the surrounding environment and thereby results in a significant change. As a result, if there are several mechanisms to perturb the channel, the total number of outcomes follows a multiplicative rule, predicting an exponential growth. That is, a transmission channel in a rich scattering environment has many stable states (depending on the details of the propagation environment) and the system transitions from one such stable state to a different one with a slight change in the propagation environment. As an example, consider an embodiment where there are panels arranged around the antenna radiating an RF signal in a geometric configuration, and by applying voltage to the panels, the panels may either act as a RF-mirror, or become transparent. If there are M reflectors that may be individually turned on/off (i.e., mirror/transparent states), the example system may create in total $2^M$ possibilities for the channel, i.e. channel states (may be specified by an M-bit index and capable of carrying M bits of data in media-based environment).

In general, channel perturbation can be achieved by changing parameters that affect propagation characteristics of the RF signal. In this manner, a transmitter has access to a collection of possible channel states that, even if the transmitter does not know what they are, can be selected based on their indices and thereby transmit information using such channel states. The set of channel states is referred to as a "Channel Codebook" (CC). This terminology, which is used herein to refer to embedding information in channel variations, should not be confused with somewhat similar terminologies conventionally used to refer to the codebook used for channel encoding, e.g., in FEC, which involve modifying the stream of transmitted symbols to reduce the impact of degradations due to transmission.

In addition to the channel codebook, there is also a source that can be varied to transmit information, called a "Source Codebook" (SC). This terminology, which is used herein to refer to embedding information in the variations in the source generating the RF signal, should not be confused with somewhat similar terminologies conventionally used to refer to the codebook used for source encoding, e.g., in compression, which involve converting a given source of information to another form to reduce the number of bits required for transmission or storage.

The net effect of such an embodiment is a channel with two inputs, an element of SC and an element of CC, and at the output there is received a combination of the two inputs (SC and CC) plus additive white Gaussian noise. In particular, if the source is one-dimensional (complex values corresponding to I and Q) and receiver has N antennas, SC may be a set of complex values, CC may be N-dimensional complex vectors and channel output is a product of SC and CC, plus AWGN, i.e., $Y=(SC \times CC)+AWGN$.

In such an embodiment, the receiver (through a training phase) learns the elements of CC, but the transmitter does not necessarily need to know these elements. Relying on some form of feedback, the transmitter and receiver can agree on a subset of CC to be used in the transmission phase. This usually translates to selecting the subset that requires less transmit energy ("selection gain"). Then, the transmitter selects an element of this selected subset (thereby embeds information in this selection), while the source of RF signal is also varied to embed additional information. The information embedded in varying the channel does not cause an increase in the transmit energy, while it results in additional constellation points at the receiver side which can span the entire space of the receive antennas. Regardless of the criterion used in selecting the subset of the channel codebook, this subset may have a distribution with spherical symmetry over the space of receive antennas, which is due to the properties of Rayleigh fading.

Selection of a subset is done by the receiver during a learning phase as receiver can measure relative merit of the elements of the channel codebook and decides which ones should be in the selected subset, and then the receiver informs the transmitter of the indices of the selected elements of the channel codebook. An example may include a primary flow of information from a node A to a node B. If the link has full-duplex capability, the selection of the subset can be achieved using a simple yes/no feedback in the link from B to A. In such an embodiment, as the yes/no feedback is performed in the same order as transmission from A to B, the indexing for the elements of CC is implicit and may occur automatically. How the selection is done by the receiver is not of particular significance with respect to the embodiments described herein, for example it can be based on maximizing the minimum distance or some other ad-hoc measure that helps to have a uniform coverage of the space of receive antennas.

An additional embodiment may include a transmitter having a source codebook with a plurality of source codewords and a channel codebook with a plurality of channel codewords. Each channel codeword corresponds to a respective antenna configuration from a plurality of antenna configurations, the transmitter configured to use data bits to select a source codeword and to select a channel codeword. Further, at least one transmit antenna may be used by the transmitter and a plurality of reflectors positioned around the at least one transmit antenna wherein the reflectors are configured to be individually turned on or off according to the selected channel codeword to provide the plurality of antenna configurations. Such reflectors may be RF mirrors described in the pending disclosure.

In a further, embodiment, a channel codebook may be generated by identifying a subset of antenna configurations from a plurality of antenna configurations of an antenna associated with a transmitter by transmitting a sequence of symbols from the transmitter to a receiver using the plurality of antenna configurations. In such an embodiment, each antenna configuration provides a unique transmission characteristic to the receiver. Further, the transmitter may receive feedback from the receiver that identifies the subset of antenna configurations and then generates channel codebook entries corresponding to the subset of antenna configurations. Thereafter, the transmitter may send data to the receiver using the channel codebook.

Using a selected subset results in saving of energy as the embodiments with a better channel quality are selected, but it also results in reducing the size of CC and thereby reduces the rate embedded in CC. On the other hand, to maintain the total rate, this requires embedding more information in SC, which in turn increases the energy. This means there is a tradeoff involved that should be optimized depending on the required rate, available energy, available bandwidth, and other relevant circumstances. An example for such a tradeoff includes the following.

EXAMPLE 1

Assume transmitter has access to 1024 possibilities (channel states) to perturb the channel and starts transmitting them one by one indexed from 0 to 1023 (transmits a fixed pilot and changes the channel from #0 to #1023 one after other), and then selects a subset of size say 256, by the receiver notifying the transmitter the selected elements indexed by values from 0 to 1023 are acceptable (total of 256). Acceptable may signify that the received signal may have a signal quality over a predetermined threshold (e.g. SNR). Then, transmitter and receiver use the selected 256 elements indexed from 0 to 255 in agreement with the original implicit ordering they were tried by the transmitter during the learning phase.

Further examples of the training phase of media-based communications include the following.

EXAMPLE 2

There are 28 possibilities for channel configurations indexed by 0, . . . 255. Such an embodiment transmits 6 bits per channel use. Phase I: Transmitters fixes the source at 1 and activates the possible channel configurations one after the other in the same order as these are indexed. Meanwhile, receiver measures the corresponding received signals. The receiver has measured 28 channel configurations. The receiver selects the best subsets of size 1, 2, 22, 23, 24, 25, 26, to be potentially used together with a source constellation of sizes 26, 25, 24, 23, 22, 2, 1 (all 7 options provide the required bit rate of 6 bits per channel use). Receiver decides which of these 7 options would perform better (e.g. lower transmit energy for a given error probability) and inform the transmitter. Information sent to transmitter can be as simple as sending the indices of the selected configurations, or include some additional information such as a scale factor to increase transmit energy depending on which channel configuration is selected. In general, receiver needs to know what may be received corresponding to each channel configuration as this information is needed in the decoding operations, but transmitter has either no information relevant to the details of the selected channel configurations, or limited information which would be used to fine tune transmission strategy, e.g., the scale factor mentioned above. The selected setup may then be used for a number of transmission, say 1000 times to send 6000 bits, and then the training is repeated to prepare for the transmission of the next 6000 bits.

EXAMPLE 3

There are 28 possibilities for channel configurations indexed by 0, . . . 255. Such an embodiment transmits 6 bits per channel use. Further, such an embodiment may have a fixed policy and always embeds 2 bits in the source variations and 4 bits in the channel variations. Transmitter fixes the source at 1 and activates the possible channel configurations one after the other in the same order as these are indexed. Meanwhile, receiver measures the corresponding received signals. Receiver accepts or rejects each configuration and in parallel with the forward link sends a yes/no answer back to the transmitter to communicate its decision. If the number of selected configurations for inclusion in the selected subset is less than the desired value of 26=64, then training phase repeats using those configurations that were not accepted in the first phase, and so on, until a selected subset of size 64 is agreed upon. A variety of such selection policies and feedback mechanisms are possible which should be clear to those skilled in the art.

Figure 3:
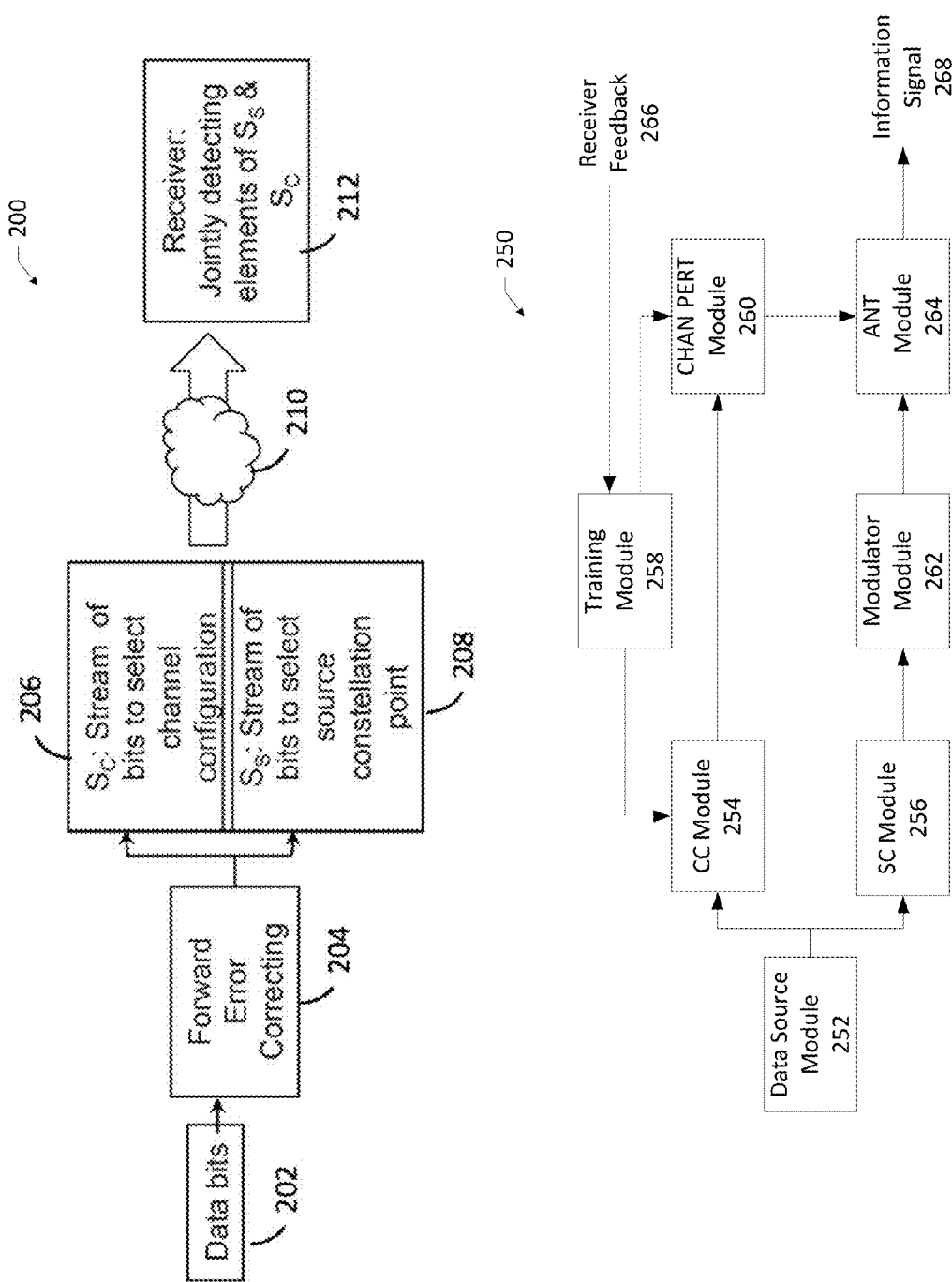
FIG. 3 shows a functional block diagram of embodiments of a system for wirelessly transmitting data using channel perturbation.

FIG. 3 shows a functional block diagram of embodiments of a system for wirelessly transmitting data using channel perturbation that includes mapping of input messages to the elements of the source codebook and the channel codebook.

An embodiment may include an apparatus comprising a transmitter having a source codebook with a plurality of source codewords and a channel codebook with a plurality of channel codewords. Further, each channel codeword corresponds to a respective antenna configuration from a plurality of antenna configurations. In addition, the transmitter configured to use data bits 202 to select a source codeword and to select a channel codeword.

Moreover, the apparatus may include at least one transmit antenna used by the transmitter and a plurality of reflectors positioned around the at least one transmit antenna. In one embodiment, the reflectors are configured to be individually turned on or off according to the selected channel codeword to provide the plurality of antenna configurations. Each of the plurality of reflectors is of a type that may include, but is not limited to, a plasma, a semi-conductor with induced charges, a mechanically-positioned reflector, and a Micro-Electro-Mechanical system reflector. In some embodiments, the plurality of reflectors comprises M reflectors and the transmitter is configured to use an M-bit index number to configure the M reflectors. Moreover, in additional embodiments, the antenna is configured to have adjustable polarization to provide the plurality of antenna configurations. Also, the at least on transmit antenna may radiate an RF signal and the reflectors may be RF-mirrors described in the pending disclosure.

FIG. 3 further illustrates an embodiment 200 of media-based communication between a transmitter and a receiver. Transmitter has data bits 202 for transmitting across a wireless channel. Forward error correcting (FEC) techniques are applied (204) to encode the bit stream S. Assume that the CC has 28=256 entries and the source can choose 4 constellation points (i.e. $S_C$ can encode 8 bits of data and $S_S$ encode 2 bits). At 206 and 208, successively, for each 10 bits to be transmitted, $S_C$=8 selected bits are applied to the CC to select channel configuration and $S_s$=2 selected bits applied to the $S_C$ to select the source constellation point. The transmission is made over the air 210 (wireless channel) and received by the receiver 212. Further, the receiver 212 detects both $S_C$ and $S_S$ bits to reconstitute the bit stream.

FIG. 3 illustrates another embodiment of a transmitter 250 of media-based or channel perturbation communication system. The transmitter 250 is capable of sending an information signal 258 to a receiver such that data is embedded into the information signal 268 using conventional modulation techniques as well as through channel perturbation techniques as described in the present disclosure.

Further, the channel perturbation techniques may include a set of channel states each of which can embed data into the information signal 258. However, portions of the set of the channel states may provide better quality reception of the embedded data than other portions. That is, better quality reception may signify that the received signal may have a signal quality over a predetermined threshold (e.g. SNR). Thus, prior to data transmission, there may be a training phase where the transmitter sends test signals as information signals, each signal corresponding to a different channel state. The receiver then provides feedback signal 256 to notify the transmitter that certain channel states provide better quality data reception than others.

For example, the transmitter may be capable of embedding data into 1024 channel states. During training phase, the transmitter sends a test signal corresponding to each channel state. The receiver receives the 1024 test signals, each corresponding to a different channel state. Further, the receiver provides the transmitter feedback on which of the 1024 channel states provide better quality signal reception. Thus, the receiver may determine that 256 of the channels states provide better quality signal reception and provides feedback to the transmitter accordingly.

Such a selection of a subset of channel states is implemented in part by the training module 258, channel perturbation module 260, and the antenna module 264. The training module 258 has access to each channel state (e.g. 1024). The training module 258 provides each channel state to the channel perturbation module 260. The channel perturbation module 260 alters or modifies each signal radiating from the antenna module 264 based on each channel state. The receiver, after receiving each test signal corresponding to a channel state, provides feedback 256 to the training module 258. The training phase then selects a subset of channel states (e.g. 256 out of 1024) based on the receiver feedback 266. Prior to a data transmission phase, the training module 258 provides the selected subset of channel states to the channel codebook module 254.

The data source module 252 provides data that is to be embedded into an information signal 268 and transmitted by the antenna module 264. The information signal 258 may have two components. One component may be a modulated carrier signal that embeds data using conventional modulation techniques. Another component may be altering the modulated carrier signal based on a channel state (i.e. data is embedded in the information signal 258 according to the channel state.) In the embodiment 250, some portions of the data may be provided to the source codebook module 258 and other portions of the data may be provided to a channel codebook module 254. The source codebook module 256 may receive the data from the data source module 252 then provide the data and instructions to the modulator module 262. Such instructions may include modulating the data onto the carrier signal using a conventional modulation technique that adjusts amplitude, phase, frequency, etc., thereby selecting magnitude and signs of in-phase and quadrature components of the carrier signal according to the instructions received from the source codebook.

The channel codebook includes a selected set of channel states provided by the training module 258. Further, the channel codebook module 254 may receive the data from the data source module 252 then provide the data and instructions to the channel perturbation module 260 to alter or modify carrier signal transmitted by the antenna module 264 based on a channel state (i.e. data is embedded in the information signal 258 according to the channel state.) Thus, the information signal carries data based on conventional modulation techniques provides by the source codebook module 256 and the channel perturbation techniques (e.g. channel states) provided by the channel codebook module 254 and channel perturbation module 260.

In some embodiments, the antenna module 264 may include one antennas or a plurality of antennas each of which are capable of transmitting test signals or information signals 258. In other embodiments, the channel perturbation module 260 includes one or more parasitic elements surrounding an antenna (possibly in a geometric configuration). These parasitic elements may include capacitors, varactors or switched capacitors that can adjust the resonance frequency of the parasitic elements. Further, adjusting the resonance frequency of the different parasitic elements provides different channel states for the signal radiating from the antenna. Moreover, in some embodiments, adjusting the resonance frequency of the parasitic elements may allow the signal radiating from the antenna to transparently flow pass the parasitic elements having no effect on the signal. In other embodiments, the parasitic elements may absorb or filter the signal radiating from the antenna corresponding to different channel states.

Additional embodiments may have the channel perturbation module 260 include reflectors or RF-mirrors as described in the present disclosure. In some embodiments, panels may be configured around an antenna, each panel having pads connected to a switched electric circuit. Power may be applied to a different set of pads that correspond to a channel state. Further embodiments may include panels (that may have subset of pads powered on or off) act as RF-mirrors and reflect the radiating signal from the antenna. Other embodiments may include panels (that may have subset of pads powered on or off) that are transparent and allow the signal radiating signal pass through without any effect.

Figure 4:
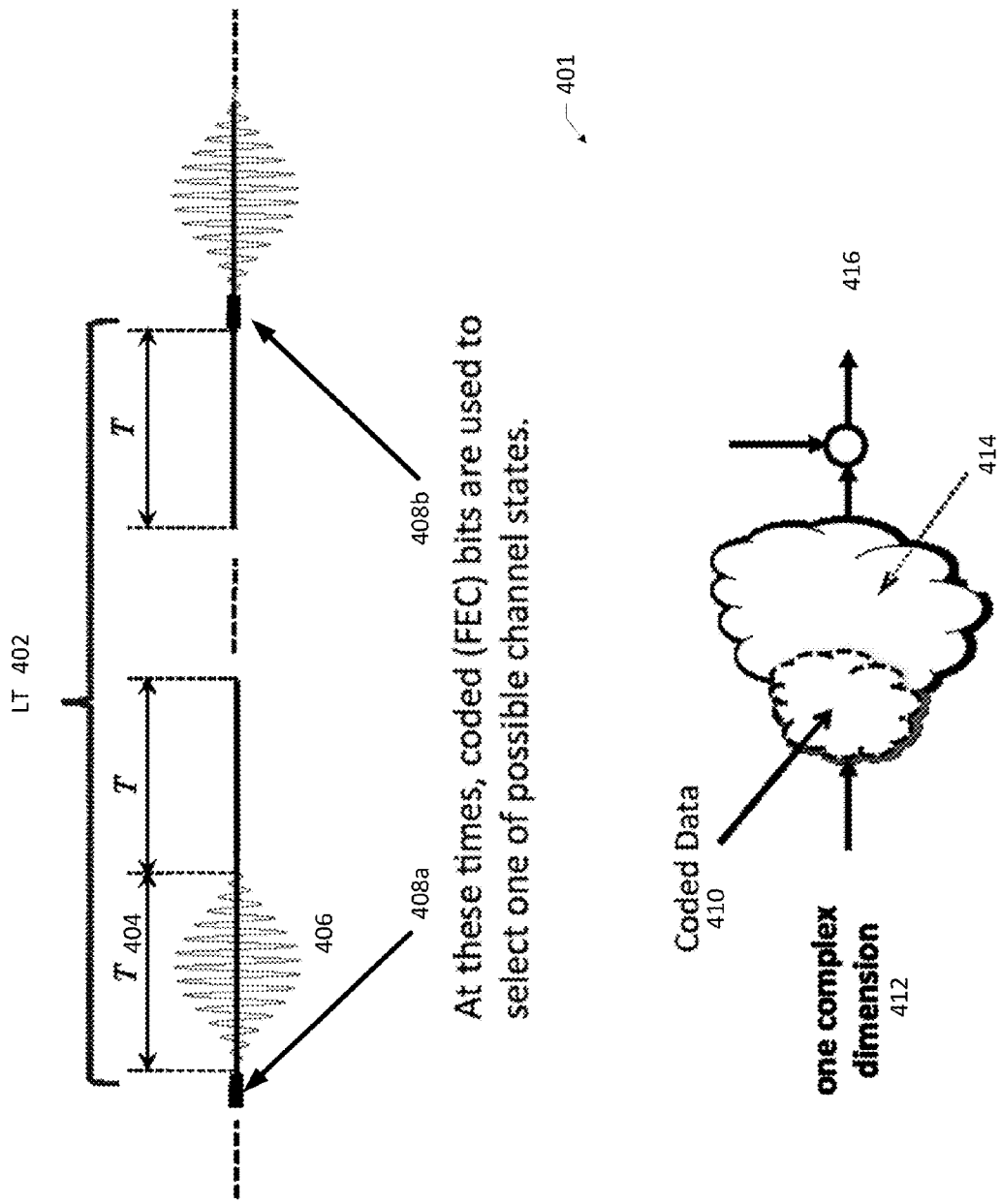
FIG. 4 shows embodiment for wireless transmission of data over a channel with an impulse response of length L.

FIG. 4 shows embodiment for wireless transmission of data over a channel with an impulse response of length L such that a spectrum of the RF source is shaped and zeros are inserted between subsequent transmissions to deal with channel memory. In addition to M-SIMO case, the present disclosure includes methods to increase effective dimensionality of the signaling space in a M-SISO (media-based Single Input Single Output) system. Such a channel impulse response has a time duration LT 402 where T 404 is symbol period. Base-TX signal is a sinusoid at the carrier frequency, windowed in [0,T] and multiplied by a spectrum shaping signal s(t) with spectrum S(w). Assuming rich scattering propagation, the corresponding base-RX signal may be a Gaussian random process in [0,T], with auto-correlation $R(\tau)=1-|\tau|/T$ convolved with the inverse Fourier transform of $\{S(w)\}^2$. A transmission block (TX-block) is composed of K consecutive base-TX signals, followed by L−1 zero symbols prior to the next TX block (408a, 408b). At the times 408a and 408b, coded FEC bits are used to selected one of possible channel states. Channel is changed in each time slot among $2^r$ possibilities (i.e., channel codebook is composed of $2^r$ elements). Overall, this is equivalent to a linear system that is changed prior to reaching to its steady state. Note that the system is linear and superposition principle holds. In this case, the received signal is oversampled (sum of time-shifted responses) by L. The resulting KL samples are full rank, yielding $LK^2/(L+K-1)$ dimensions per unit time. The extra dimensions due to up-sampling are correlated, degrading the performance, but at the same time, they have correlated noise which improves the performance. For detection, iterative decoding can be used by applying probability propagation, or Trellis decoding. Relying on similarities to M-SIMO, it follows that the source codebook is composed of a discrete set of shells (circular shells) with uniform phase.

Further, FIG. 4 shows an embodiment 401 that includes a carrier signal with one complex dimension 412. Coded data 410 is modulated onto the carrier signal 412 and carried across a wireless channel 414 having an impulse response length L. The resulting received signal may have several characteristics that include a total signal energy LE and basis or orthogonal complex dimensions of L 416.

Figure 5:
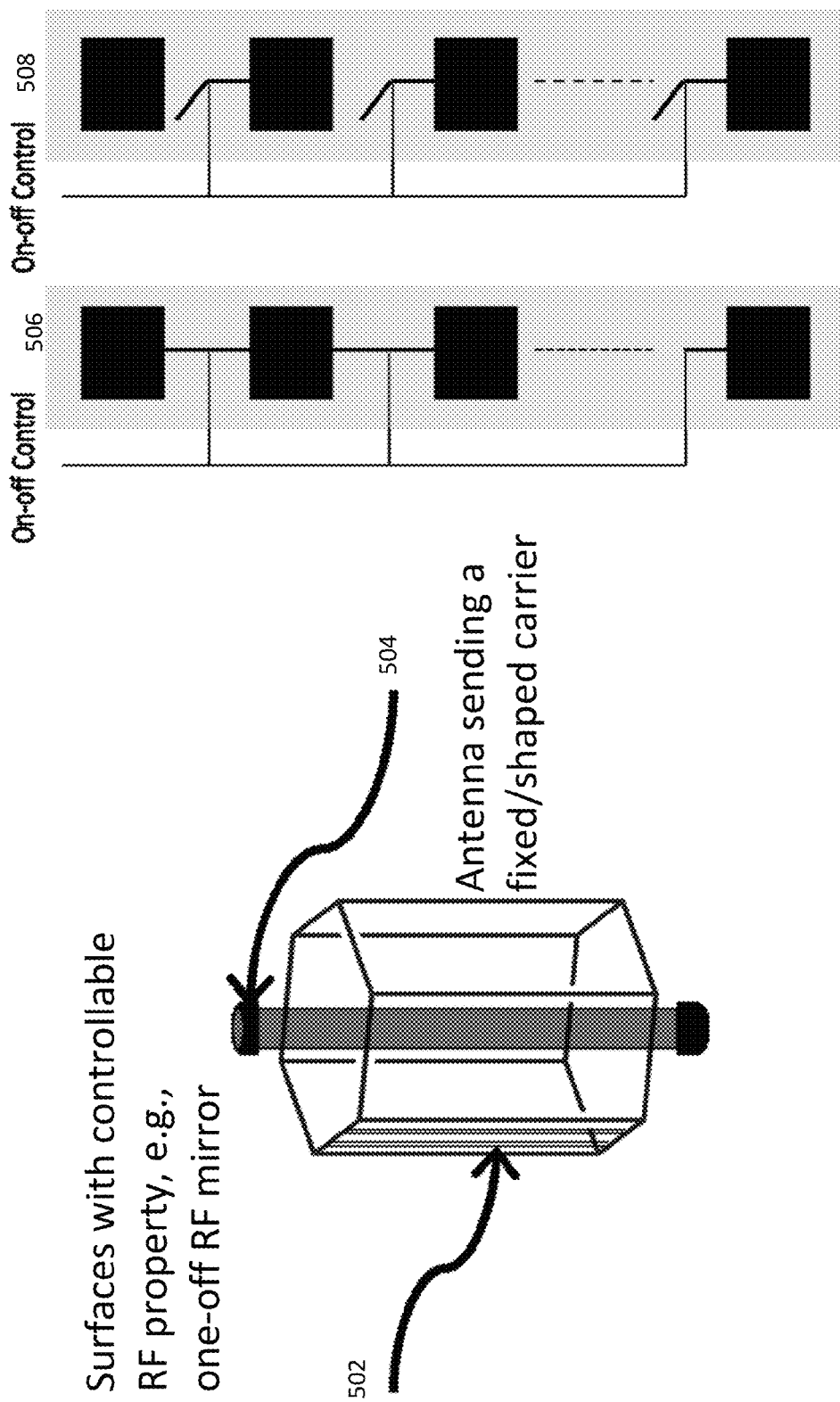
FIG. 5 shows an embodiment of for wireless transmission of data using channel perturbation using an RF-mirror used to reflect RF signals.

FIG. 5 shows an embodiment of for wireless transmission of data using channel perturbation using an RF-mirror used to reflect RF signals. In some embodiments, the RF signals are reflected in part, with methods for adjusting the level of reflection, (e.g. tunable RF-mirror). Hereafter, an RF-mirror is defined as an object, which would pass, reflect, partially pass/partially reflect an RF signal. An RF-mirror can have static parts with fixed RF properties, as well as dynamic parts with RF proprieties that are dynamically adjusted through digital (on-off) or analog control signals. Such a construction may be called a tunable RF-mirror. RF-mirrors and tunable RF-mirrors may be useful components in inducing channel variations/perturbations.

FIG. 5 shows an embodiment to create an RF mirror. An antenna 504 of a transmitter that radiates an RF signal may be surrounded by a one or more surfaces 502 in a certain configuration. For example, in FIG. 5, the surfaces 502 surround the antenna 504 in a hexagonal configuration. Each surface may have one or more columns of interconnected pads (506, 508). The interconnected pads may be coupled together using one or more switches 508. Power may be applied to each of the pads by configuring the interconnected switches accordingly. The switches on any one surface for the interconnected pads may be either all closed, or all open, which results in an on-off RF mirror.

Thus, in one embodiment, if no power is applied to all the pads on each surface 502, then the panels are transparent. That is, that the RF signal radiating from the antenna 504 radiates through the surfaces 504. In an alternative embodiment, if power is applied to all the pads on each surface 502, then the RF signal radiating from the antenna 504 is reflected by the surfaces 502 causing channel perturbations accordingly. In another alternative embodiment, if power is applied to some of the pads on each surface, then the RF signal radiating from antenna 504 may be partially reflected and partially passed through the surfaces 502.

Figure 6:
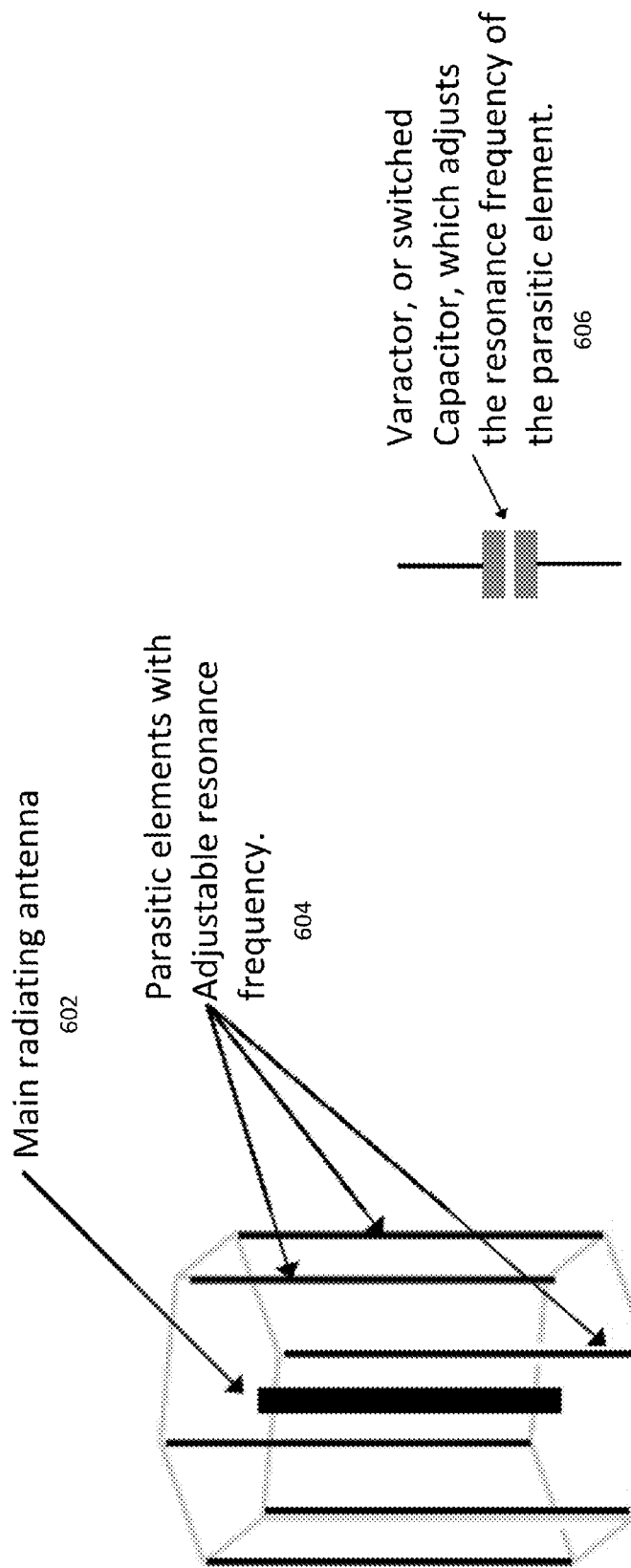
FIG. 6 shows an embodiment for wireless transmission of data using channel perturbation using a tunable RF-mirror.

FIG. 6 shows an embodiment of for wireless transmission of data using channel perturbation using a tunable RF-mirror. In such an embodiment, a transmitter may have a main radiating antenna 602 that transmits an RF signal. Further, there may be one or more parasitic elements with an adjustable resonance frequency 604. Such parasitic elements may be arranged around the main radiating antenna 602 in various configurations. For example, in FIG. 6, the parasitic elements 604 are arranged in a hexagonal arrangement around the main radiating antenna 602. Each parasitic element may be coupled to a capacitor, varacter or to one or more switched capacitors that adjust the resonance frequency of the parasitic element 606.

Adjusting the resonance frequency of the parasitic elements 604 causes channel perturbations on the signal emanating from the main radiating antenna 602. Each channel perturbation may correspond to a channel state in a channel codebook. For example, setting the capacitors of two of the parasitic elements such that each are at a resonance frequency may correspond to one channel state in a channel codebook. Alternatively, setting the capacitors of all six of the parasitic elements such that each are at a resonance frequency may correspond to another channel state in a channel codebook.

Further, setting the capacitor coupled to each parasitic elements such there is no resonance may allow the parasitic elements to be transparent in view of the signal emanating from the main radiating antenna 602. Alternatively, a setting of the capacitor coupled to each parasitic elements may allow the parasitic elements to act as a partial or substantially full RF-mirror transparent to the signal emanating from the main radiating antenna 602. Hence, such a capability allows the arrangement of parasitic elements 604 to be called a tunable RF-mirror.

Figure 7:
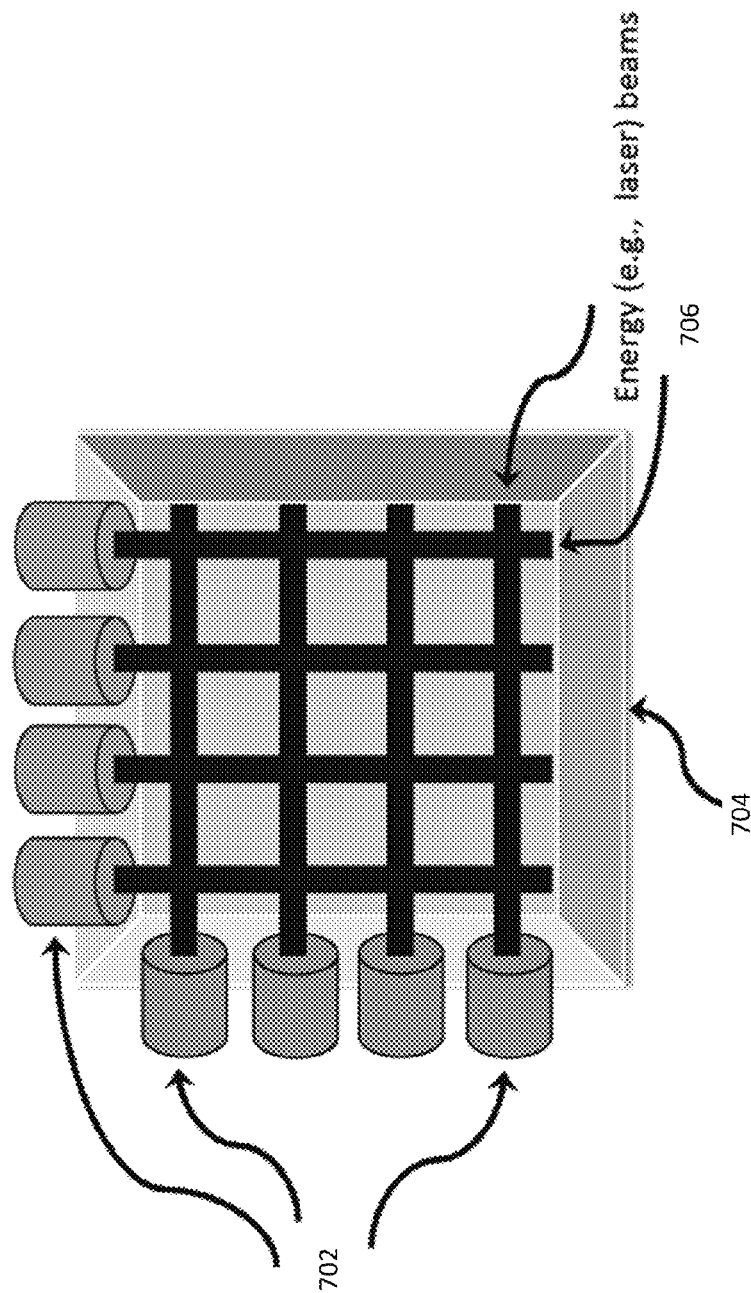
FIG. 7 shows an embodiment for wireless transmission of data using channel perturbation using an on-off RF-mirror.

FIG. 7 shows an embodiment of for wireless transmission of data using channel perturbation using an on-off RF-mirror; In particular, FIG. 7 shows another embodiment of an RF-mirror. Material releasing electrons or holes, called charge-releasing-object hereafter, releases charge, typically electrons, in response to the energy 704 absorbed from a source 702 of energy, typically a laser 706, which in turn reacts to the control signals. The source 702 may emit a laser or light source through or on the surface of the material. An example of material charge-releasing-object 704 to be used with a light source is a semi-conductor, e.g., structures used in solar cells, Gallium Arsenide, materials used as photo-detectors in imaging applications such as a Charge-Coupled-Device (CCD), materials used to detect light in free space optics, materials used to detect light in fiber, or high resistivity silicon, typically with a band-gap adjusted according to the light wavelength. Another example is plasmas with their relevant excitation signaling as the energy source.

For the example in FIG. 7, the intensity of light, which is typically controlled by the level of input current to the laser and number of lasers that are turned on, contributes to the amount of light energy converted into free electrons and consequently affects the conductivity of the surface. This feature can be used to convert the corresponding RF-mirror to a tunable RF-mirror. In another embodiment, a mirror may be placed to reflect light, called a light-mirror hereafter, on top to increase contact of the light with the surface of the charge-releasing-object underneath, and adjust such a light-mirror towards tuning of the overall RF-mirror.

Figure 8:
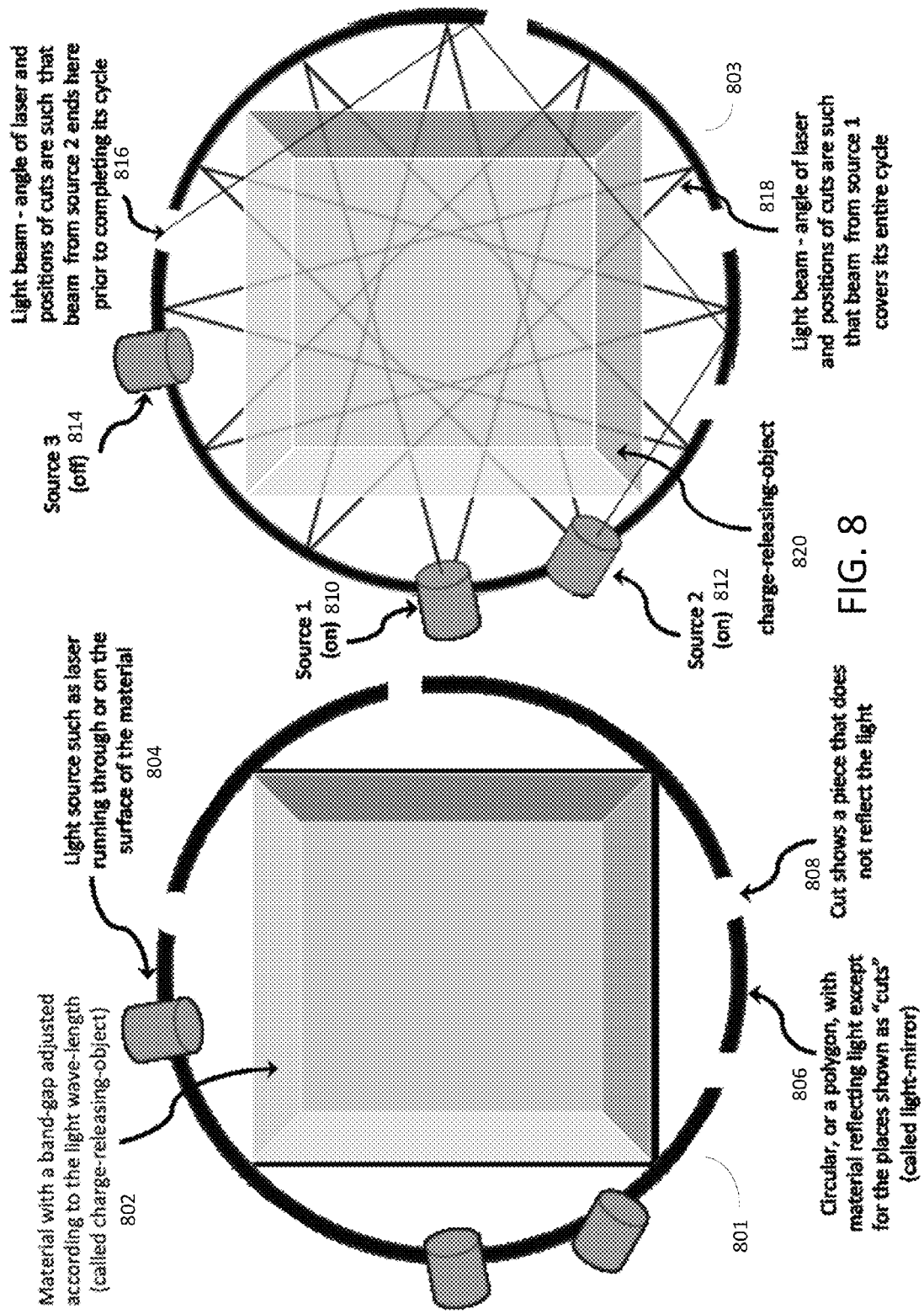
FIG. 8 shows an embodiment for wireless transmission of data using channel perturbation using tunable RF chamber surrounding transmit and/or receive antenna.
Figure 9:
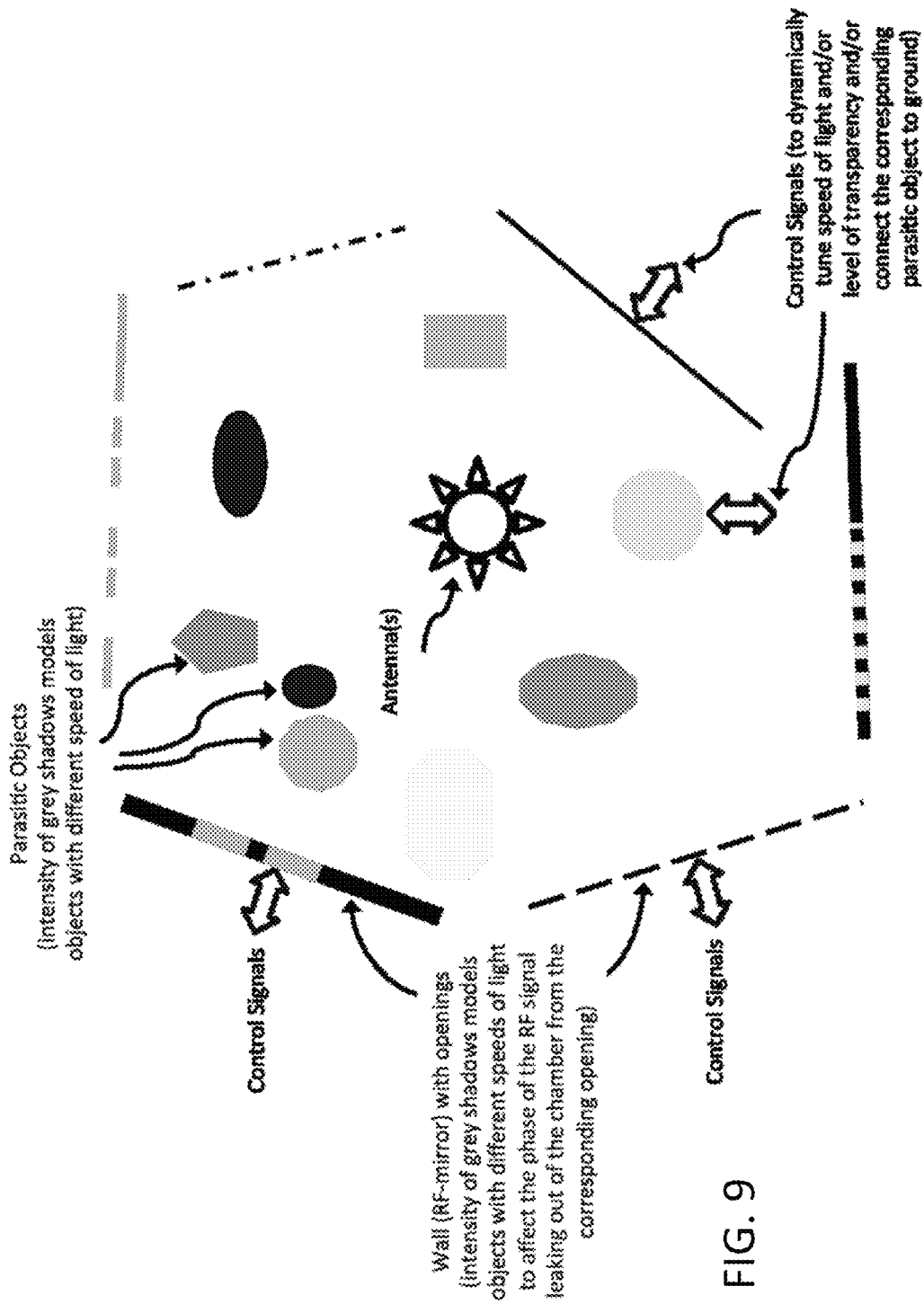
FIG. 9 depicts an environmental model of objects that affect the phase of RF signals.
Figure 10:
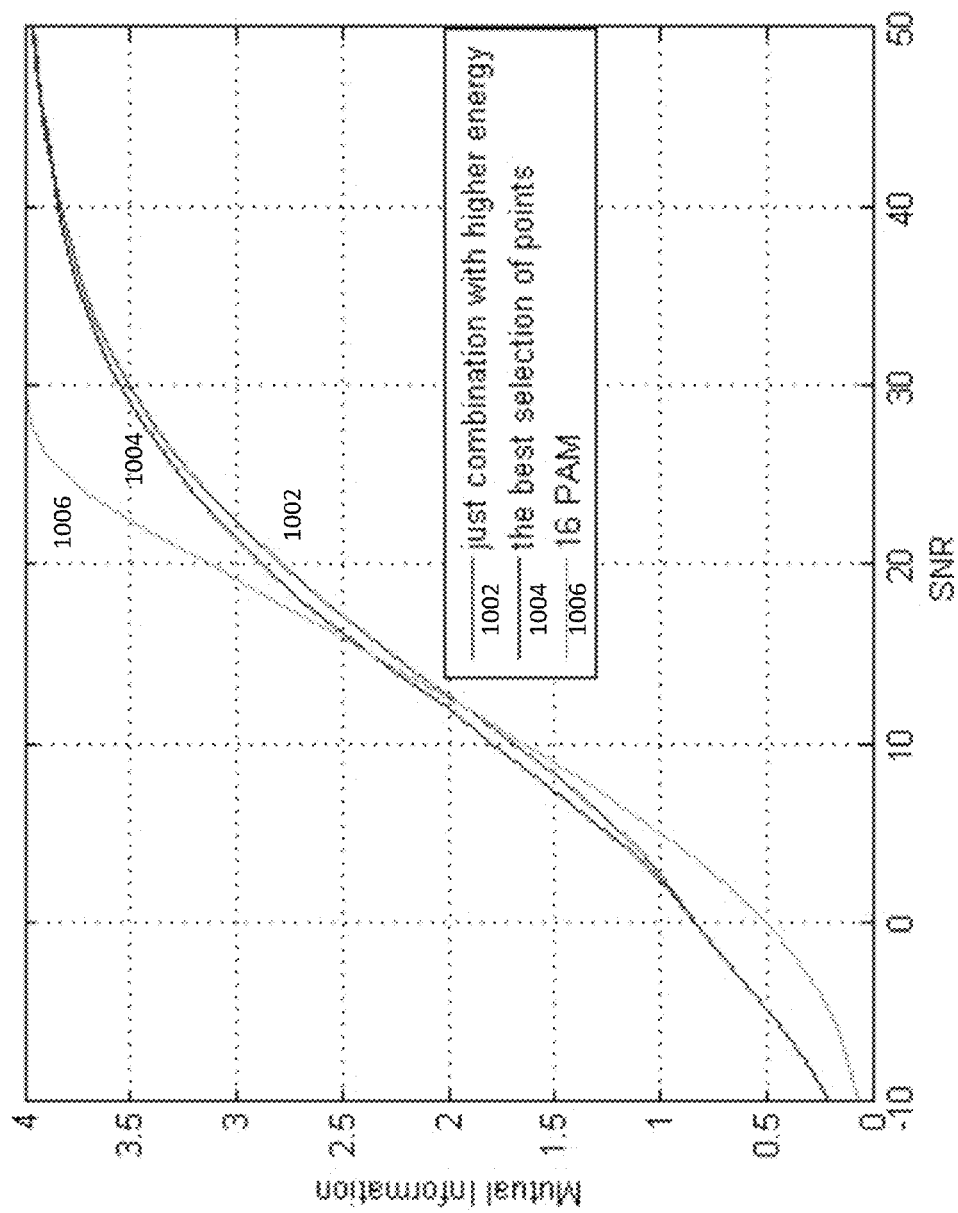
FIGS. 10-17 shows performance data of different embodiments that wirelessly transmit data using channel perturbation compared to performance of traditional MIMO systems.
Figure 11:
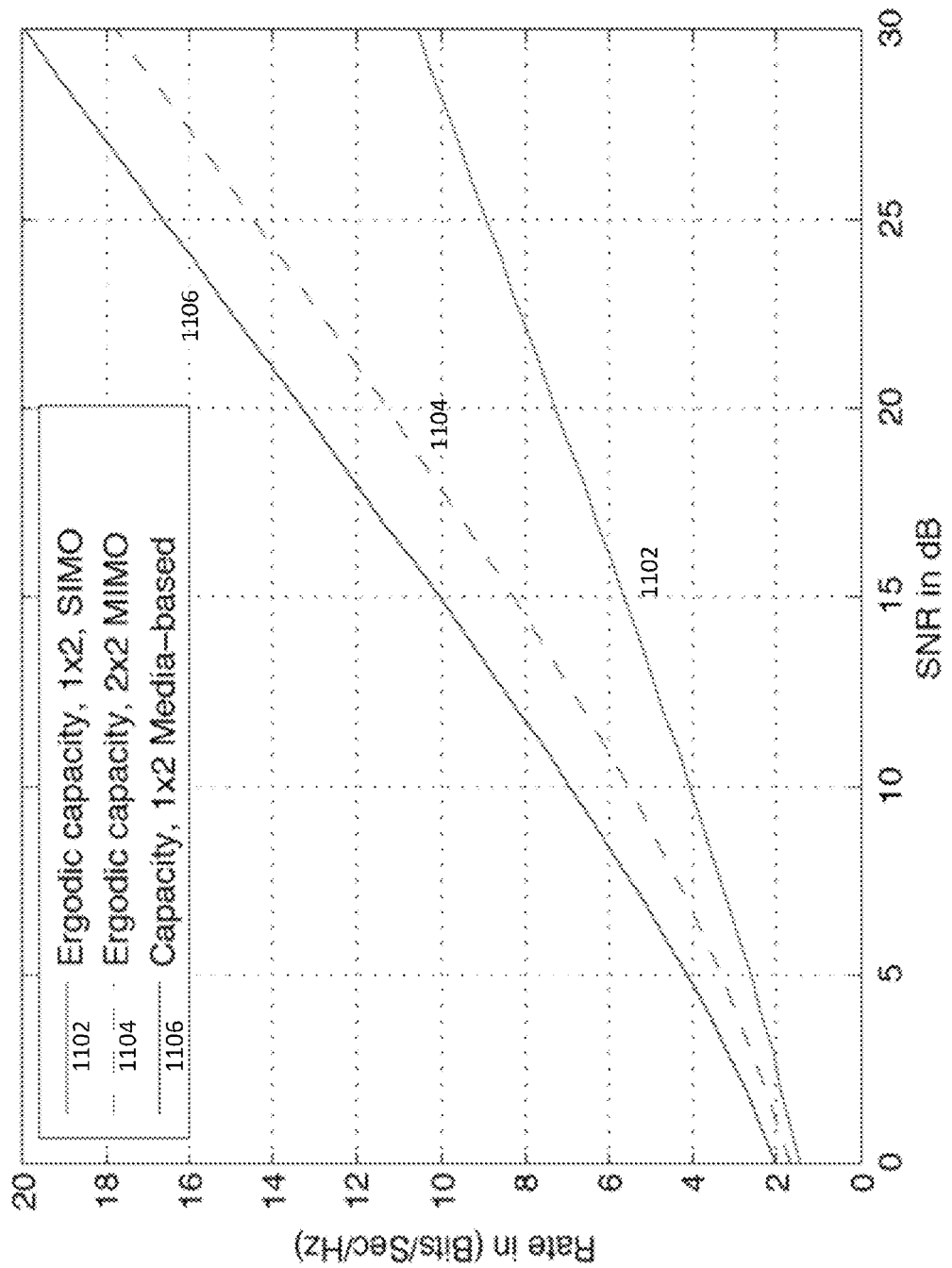
Figure 12:
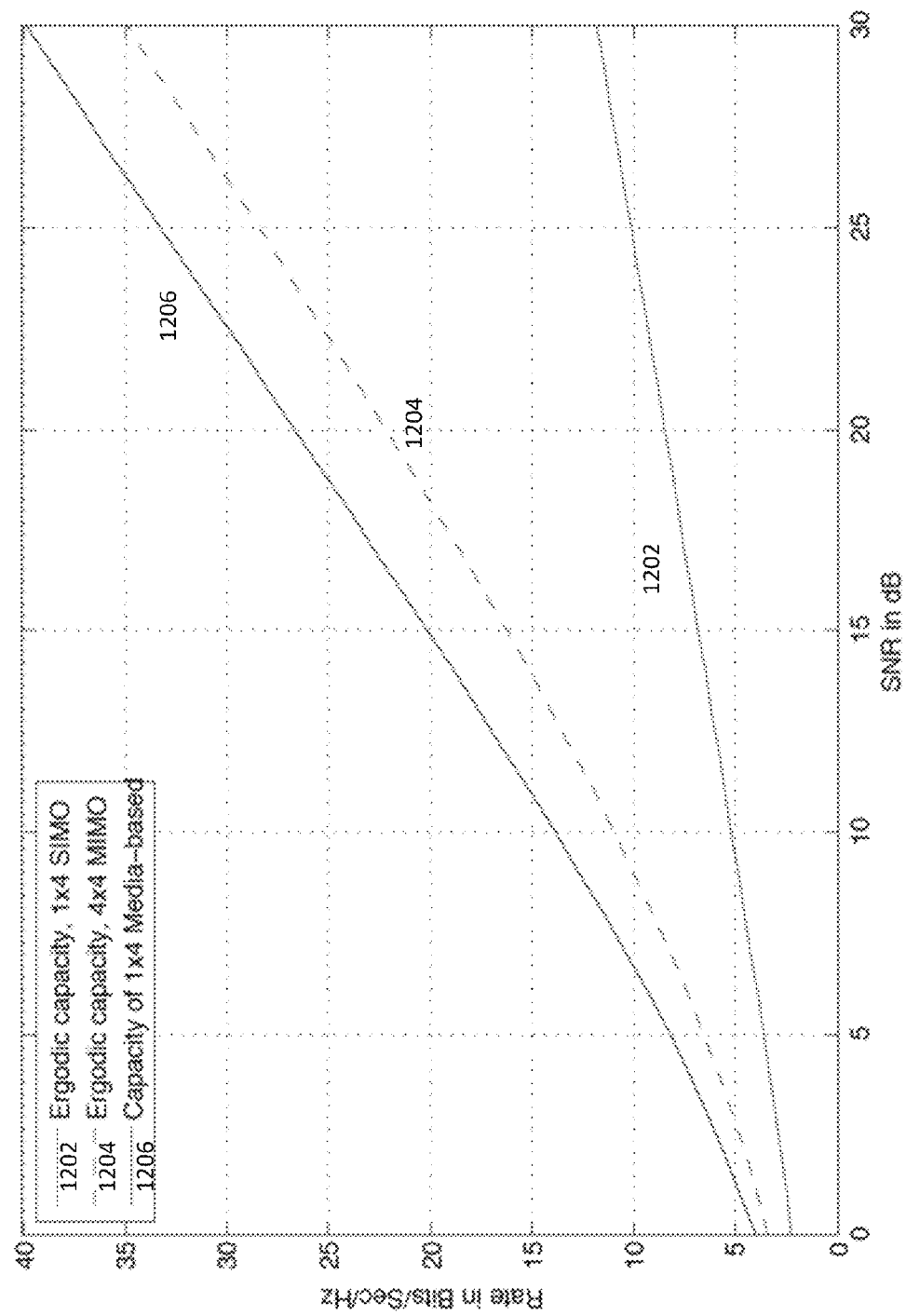
Figure 13:
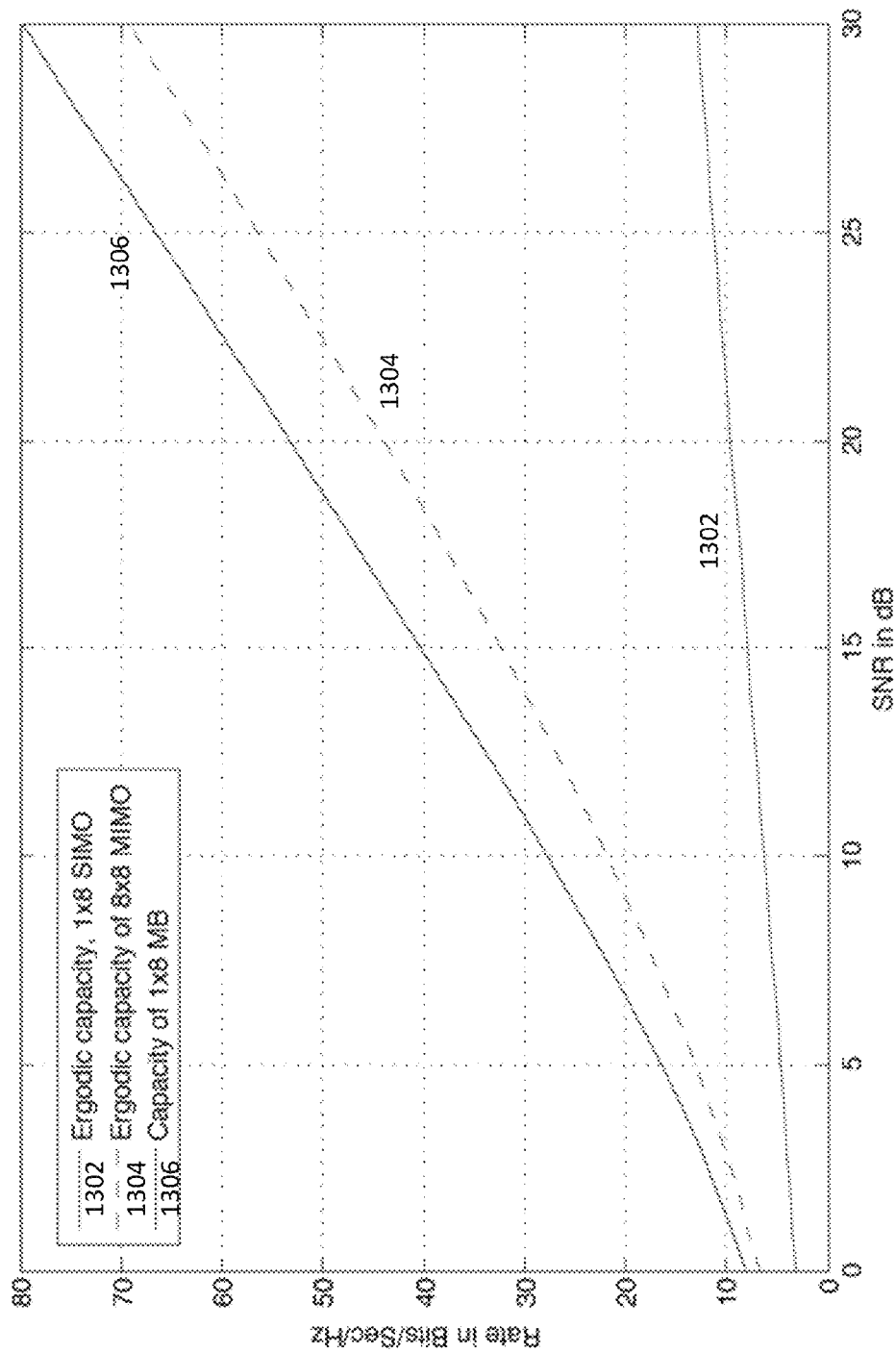
Figure 14:
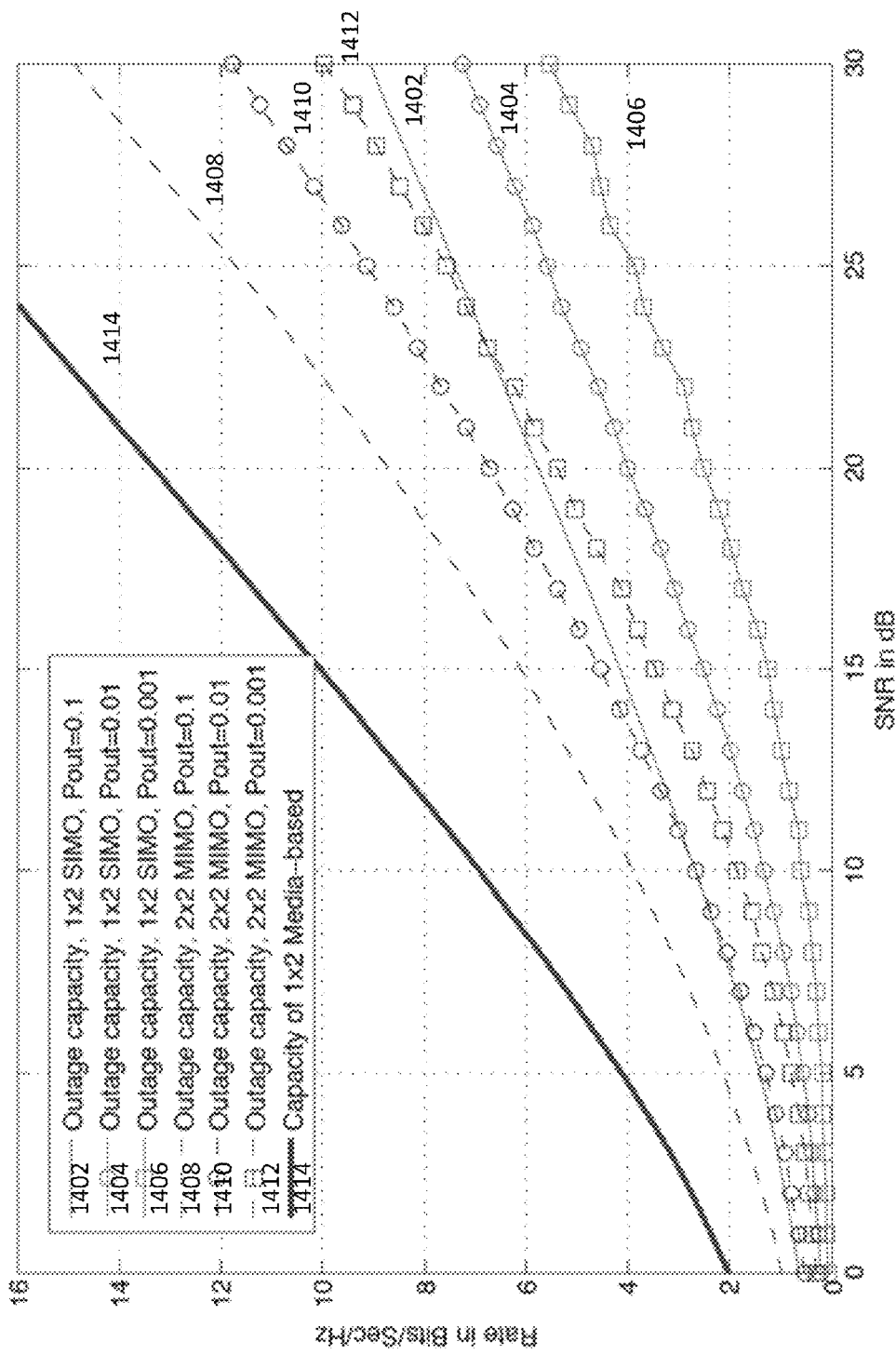
Figure 15:
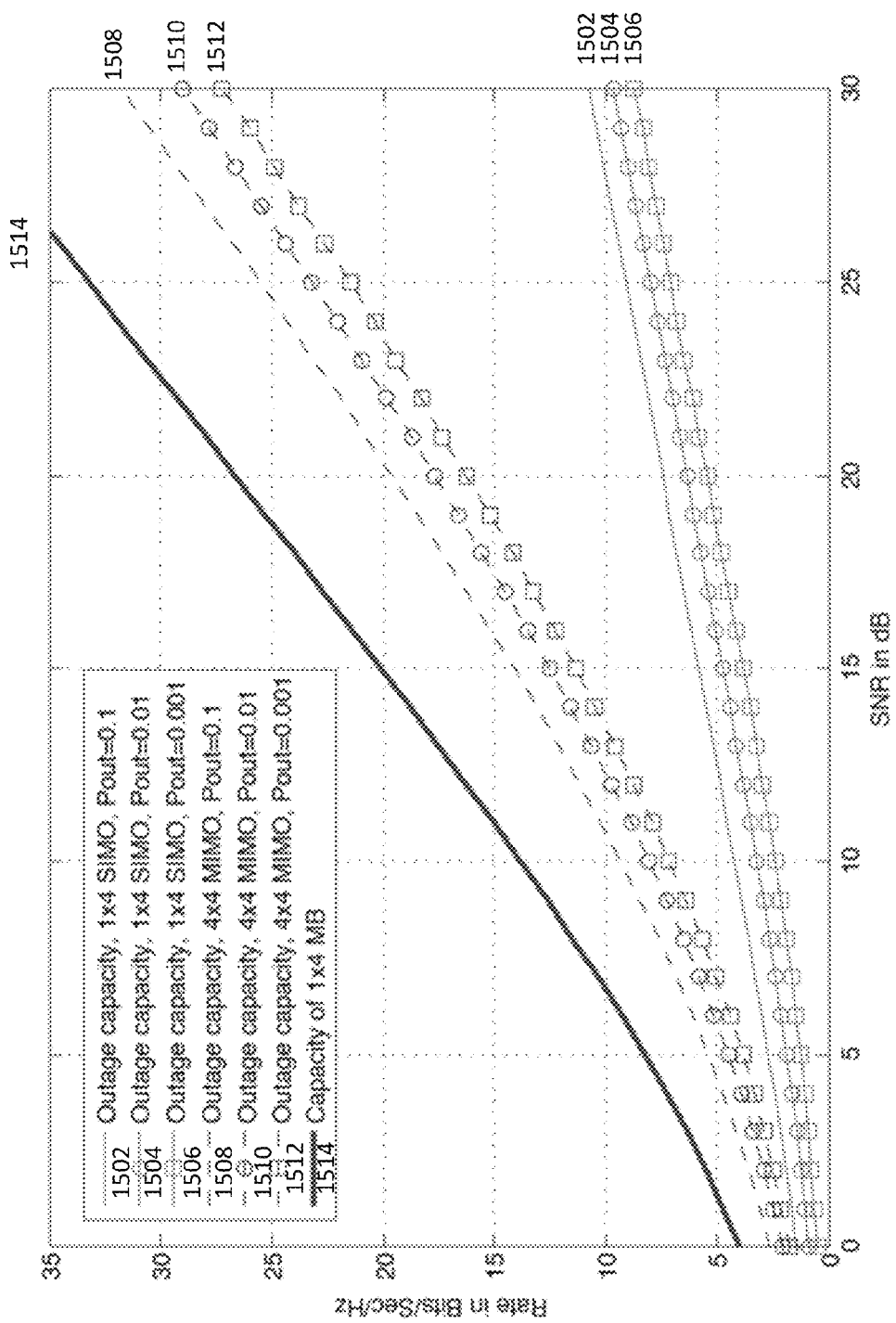
Figure 16:
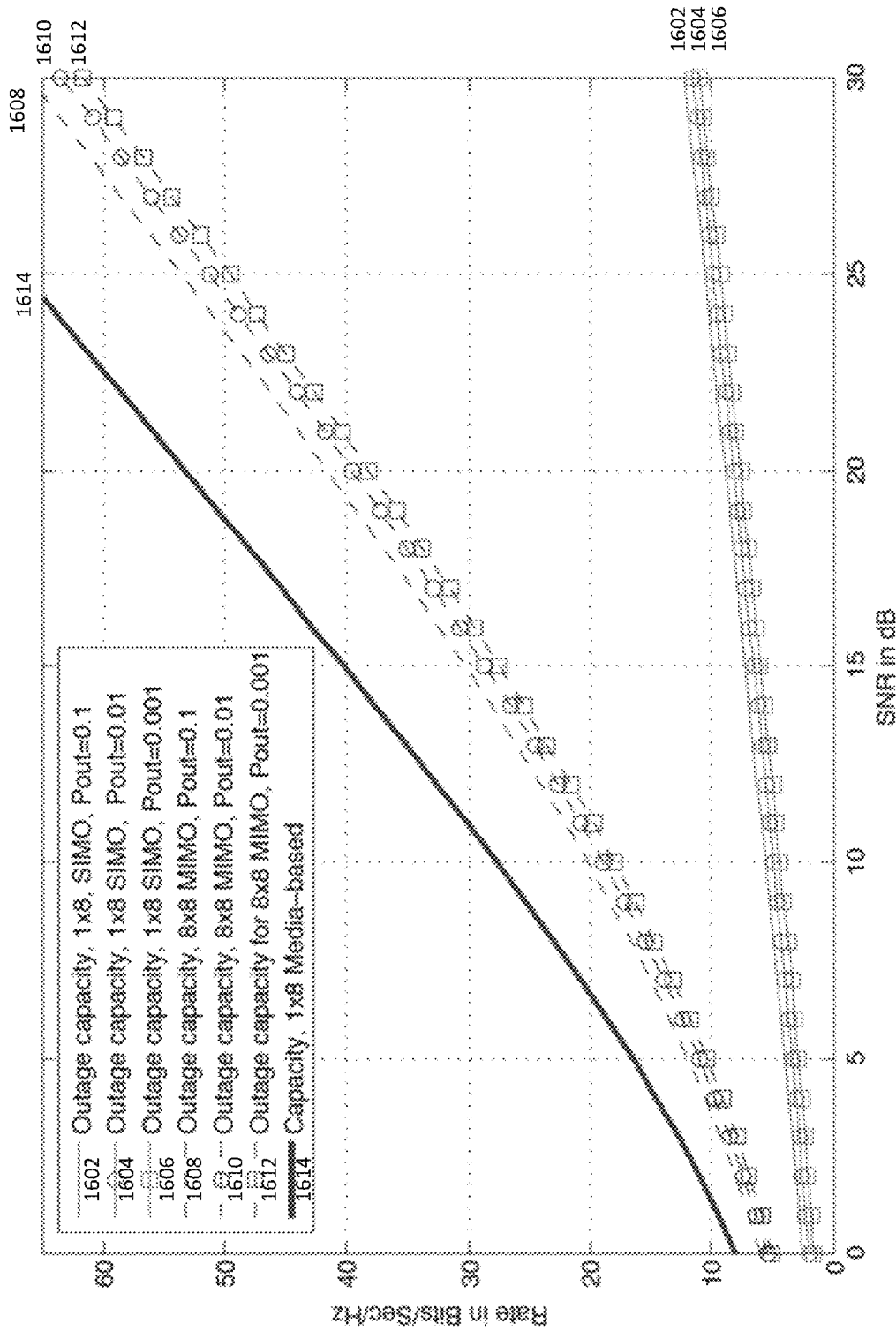
Figure 17:
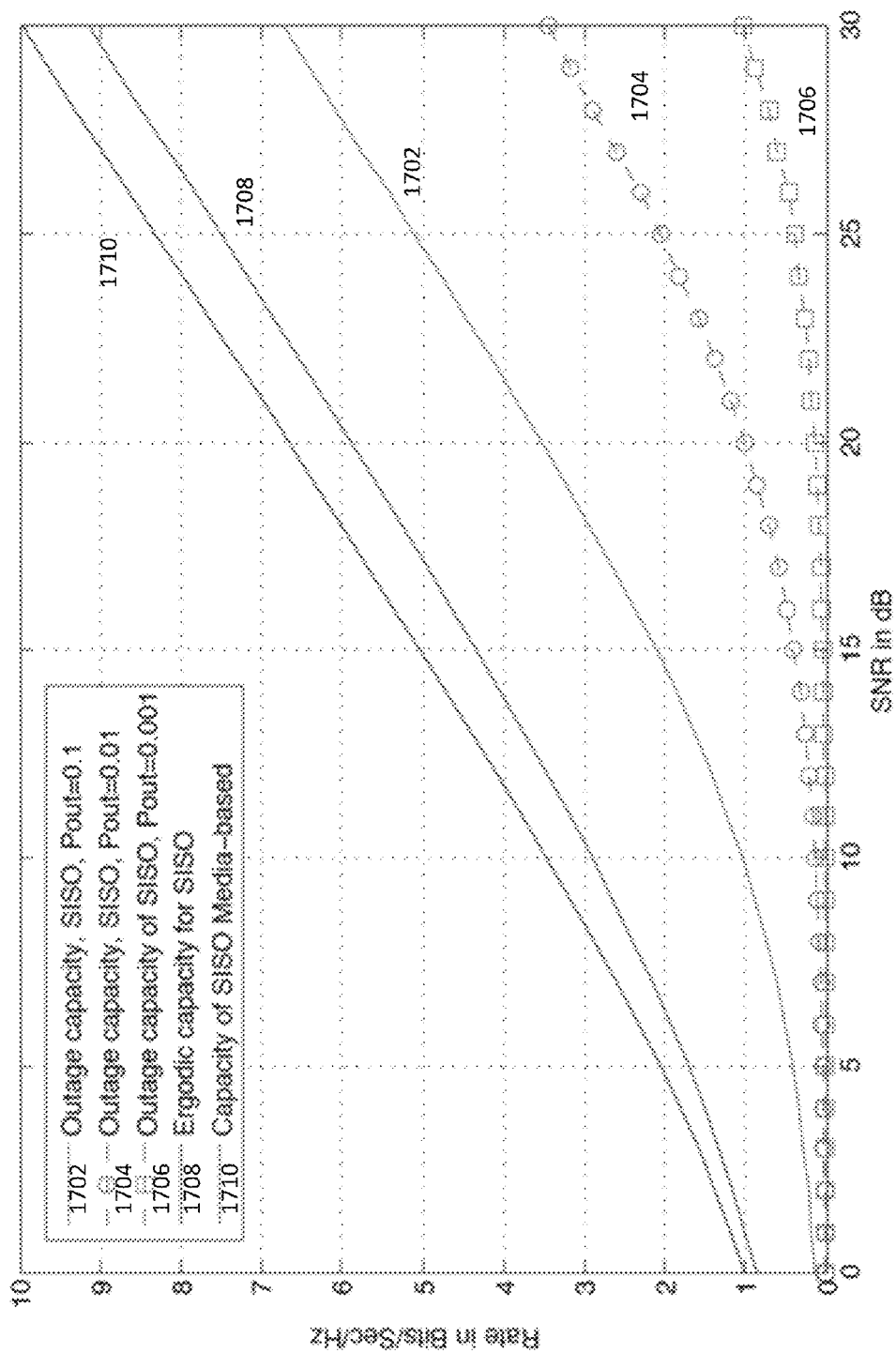

FIG. 8 shows an embodiment for wireless transmission of data using channel perturbation using tunable RF chamber surrounding transmit and/or receive antenna One embodiment 801 shown in FIG. 8 includes light source such as a laser running through or on the surface of a charge-releasing object 802. Such a material may have band-gap adjusted according to a light wavelength emanating from one or more light sources. The embodiment 801 may include a light-mirror placed around the charge-releasing-object. The objective for this light-mirror is to confine the light to increase the amount of energy absorbed by the charge-releasing-object. In addition, through adjusting the angle of different light sources, it is possible to control the number of reflections for any given source and thereby the amount of energy from that source releasing charges The light mirror may generate a light configuration around the object such a circle or polygon 806. Such a feature can be further enhanced by creating cuts 808 in the light-mirror to stop reflections for any given light source at a point of interest. These cuts can be controllable as well (e.g. pieces of on-off light-mirrors) to enhance the controllability of the amount of released charges and thereby the behavior of the RF-mirror in response to the RF signal.

Another embodiment 803 in FIG. 8 shows another example of a light-mirror around the charge-releasing-object. In such an embodiment, there are three light sources such that source 1 810 and source 2 812 are on and source 3 814 is off. Such light sources emanate light around a charge-releasing object 820 to act as a tunable RF-mirror.

Note that the light from each laser, depending on its angle, can go through many reflections at distinct points, covering several turns around the loop, until it hits the mirror at one point for the second time. This completes one cycle of reflection. After this second incidence, the same path may be covered again and again with subsequent cycle overlapping in space. By adjusting the starting angle of the beam light, the number of such reflections in a cycle can be adjusted which in turn affects the area of the charge-releasing-object that is exposed to light. Such a feature can be used to have a tunable RF-mirror (depending on the combination of light sources that are turned on), even if all sources have a constant power. Additionally, it is possible to adjust the level of input current driving the laser(s) for tuning purposes.

For example, at 819, a light beam such that the angle of a laser light source and positions of cuts are such that the beam from source 2 812 ends prior to completing its cycle. Further, at 818, a light beam such that the angle of the laser light source and positions of cuts are such that the beam from source 1 covers its entire cycle.

FIGS. 10-17 shows performance data of different embodiments that wirelessly transmit data using channel perturbation compared to performance of traditional MIMO systems.

Many embodiments divide the rate between the two codebooks (source codebook and channel codebook). This results in a tradeoff between energy efficiency and bandwidth efficiency. The selection rule should aim at minimizing the required energy for a given target rate and subject to certain probability of outage. The solution for a SISO system (without up-sampling) follows the convention: select the channel with the highest gain and then use it with a Gaussian source codebook (or its practical realization using a discrete constellation). Relying on existing arguments in the context of user selection in multi-user networks, it follows that (for a Raleigh fading channel), the saving in required energy scales with the log of the cardinality of the channel codebook. Another embodiment occurs when there is a single transmit antenna and multiple receive antennas (which, hereafter, is called Media-based Single-Input Multiple-Output, or M-SIMO).

In general, the receiver can also provide the transmitter with partial information about the relative merit of the selected subset of the channel codebook to enable the transmitter to adjust its transmission policy. For example, transmitter can adjust the probability of selecting different channel codewords (elements of selected subset of the CC) and/or make the source codeword (e.g., its energy) dependent on the selected channel codeword.

Consider the embodiment that the receiver informs the transmitter with a single yes/no feedback about the selected subset of channel codebook to be used as information bearing in the actual transmission. Under these circumstances, as transmitter does not know the elements of the channel codebook, it can be concluded that: 1) Source codebook may be the same for all channel code-words. 2) Transmitter selects the source code-word and the channel codeword independently. 3) Transmitter selects the channel codewords with equal probability. It is further concluded that: 1) At the receiver, variations due to the source codeword span a single (complex) dimension along the vector of received channel code-word. 2) Due to spherical symmetry of Raleigh fading, these variations depend only on the magnitude of the received channel codeword. For this reason, optimization of source signal involves only the radial component of the received vector. Receiver uses joint decoding to minimize P {outage} which captures error probability using language of Information Theory.

The overall objective for M-SIMO is as follows:

Minimize:$P\{outage\}=P\{I(CC,SC;Y=SC\cdot CC+n)\leq \epsilon\}$ for $E(SC2)\leq P$, Minimize:$P\{H(Y=SC\cdot CC+n)\leq \delta\}$ for $E(SC2)\leq P$ Where SC,CC refer to the source and channel codewords, respectively, Y is the channel output, n is the vector of AWGN, P reflects the constraint on transmit energy, and probabilistic behavior governing the outage event is due to randomness in the structure of the channel codebook. Note that SC∈SC is a complex number and CC∈CC is an N-dimensional complex vector. It is assumed that the cardinality of CC, denoted by |CC|, is finite. Otherwise, the capacity would become infinity. This is unrealistic and reflects the point that for large values of |CC|, the assumption of rich scattering is not valid any longer. Now consider the optimum distribution of the source codebook. Mutual information can be decomposed as, $I(CC,SC;Y)=I(\angle SC;Y)+I(|SC|,CC;Y|\ SC)$ where |SC| and ∠SC specify the magnitude and phase of SC.

Due to spherical symmetry, optimum source codebook has a uniform phase. This can be verified noting that $P\{I(\angle SC; Y)\geq \theta\}$ is maximized, for all θ, if ∠SC is uniform and this choice affects neither energy, nor probabilistic behavior of I(|SC|,CC;Y|∠SC). As such, $I(|SC|,CC;Y|\angle SC)=I(CC;Y|\angle SC)+I(|SC|;Y|\angle SC,CC)$.

As far as contribution of the term I(|SC|;Y|∠SC,CC) to the outage event is concerned, |SC| should have a continuous distribution satisfying E(|SC|2)=P. On the other hand, as far as contribution of the term I(CC;Y|∠SC) is concerned, ISM should be a constant, i.e., |SC|2=P. For a given distribution of |SC| satisfying E(|SC|2)=P, contribution of the term I(CC; Y|∠SC) reduces if values of |SC| are merged into mass points at the centroid of any given partitioning of the range of |SC|, but this compromises the contribution of I(|SC|;Y|∠SC,CC) to the outage capacity. This means there are two conflicting phenomena. By increasing the number of such partitions, I(|SC|;Y|∠SC,CC) approaches the case that |SC| has a continuous distribution. As a result, the solution maximizing the sum of the two terms uses a discrete set of values for |SC|. In other words, SC is composed of a discrete set of circular rings (shells) used possibly with different probabilities (to realize some shaping gain), where points on each shell are equally likely (SC has a uniform phase).

It remains to see what happens to the power spectrum when the channel is perturbed from one transmission to another. The power spectrum of such a channel will be the average of the power spectrums of all CC∈CC, times the power spectrum of SC∈SC. The spectrum of the source signal is also governed by the spectrum of a rectangular pulse train (representing the switching operations involved in selecting CC∈CC) and the overall bandwidth will be infinity. A similar issue exists in traditional communication systems in the sense that a system cannot be limited in both time and frequency. To address this issue, it is noted that the power spectrum observed by any receiver will include the power spectrum of SC∈SC as a multiplicative factor, and consequently, by shaping the power spectrum of SC∈SC, the overall bandwidth can be limited. This is equivalent to shaping the input signal to have smooth transitions between consecutive switching of the channel state, for example using raised-cosine pulse shaping.

Embodiments may include the following to improve performance: 1) frequency synchronization, 2) feedback between transmitter and receiver in selecting the subset of channel codewords. Relying on full-duplex links may also improve performance. Note that when the receiver sends the pilot to the transmitter, there is no need for pulse shaping as the variations in the channel are happening around the main transmitter. Embodiments also include the receiver needs to learn the codebook resulting in a training phase.

Another embodiment includes channel equalization. If the channel is fixed, a variety of methods (equalization) can be used to compensate the effect of having an impulse response that is extended in time (e.g., use OFDM for equalization). However, in media-based wireless data transmission (i.e. wireless data transmission using channel perturbation), the channel changes in each signaling interval and consequently traditional methods for equalization are not applicable. To address this issue embodiments send an impulse through the channel and receive a response of length M (symbols), those M components span an M-dimensional space. As a result, by inserting periods of silence of length M−1 between transmitted symbols, receiver can increase the number of receive dimensions by M and consequently may not lose rate due to the wait time. Note that in the traditional systems relying only varying the RF source, energy efficiency can be improved by combining the information relevant to each transmitted symbol which is received within an impulse response (matched filters, Rake receiver, OFDM receiver), but unlike the methods and systems disclosed herein which rely on intentionally changing the channel, this operation does not change the effective dimensionality of the signaling space.

Figure 18:
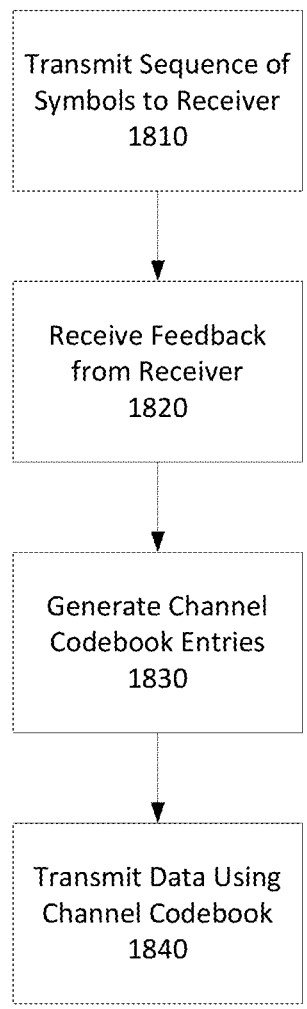
FIG. 18 is a flowchart of an example method 1800 for wirelessly transmitting data using channel perturbation.

FIG. 18 is a block diagram of a method 1800 for generating and using a channel codebook by identifying a subset of antenna configurations from a plurality of antenna configurations of an antenna associated with a transmitter in accordance to one embodiment. The method 1800 includes generating a channel codebook by transmitting a sequence of symbols from the transmitter to a receiver using the plurality of antenna configurations, as shown in block 1810. Each antenna configuration provides a unique transmission characteristic to the receiver, In one embodiment, the antenna configurations are generated by changing the propagation environment around the transmit antennas.

The method 1800 further includes receiving feedback from the receiver that identifies the subset of antenna configurations, as shown in block 1820. In one embodiment, the received feedback includes indices of the subset of antenna configurations. In another embodiment, the receiver feedback includes a scale factor for some of the antenna configurations in the subset to increase a transmit power when the corresponding antenna configuration is used. In an alternate embodiment, the feedback is received after each symbol of the sequence of symbols is transmitted. In an additional embodiment, M reflectors are positioned around the transmit antenna and the M reflectors are individually turned on and off to provide 2M antenna configurations. Further, the antenna configurations are selected using an M-bit index number. The reflectors can be of a type that includes but is not limited to a plasma, a semi-conductor with induced charges, a mechanically-positioned reflector, and a Micro-Electro-Mechanical system reflector.

Additionally, the method 1800 includes generating channel codebook entries corresponding to the subset of antenna configurations, as shown in block 1820. Moreover, the method 1800 further includes transmitting data from the transmitter to the receiver using the channel codebook, as shown in block 1840.

In one embodiment, transmitting data using the channel codebook includes using data to select a sequence of antenna configurations from the subset of antenna configurations and transmitting symbols using the selected sequence of antenna configurations such that the transmitted symbols are selected from a source codebook. In another embodiment, the source codebook includes a plurality of constellation points. In an alternate embodiment, selection of a source codeword from the source codebook is dependent on a selected channel codeword from the channel codebook. The source codebook includes codewords corresponding to constellation points arranged in a plurality of shells. Moreover, constellation points within each shell of the plurality of shells are selected with equal probability. Further, each shell of the plurality of shells is selected with different probabilities. In addition, the propagation environment of transmitting the symbols and data is changed through changing the radio frequency characteristics of near-by objects.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method comprising:
  generating a channel codebook by identifying a subset of antenna configurations from a plurality of antenna configurations of an antenna associated with a transmitter by:
    transmitting a sequence of symbols from the transmitter to a receiver using the plurality of antenna configurations, wherein each antenna configuration provides a unique transmission characteristic to the receiver, and wherein the antenna configurations are generated by changing the propagation environment around the transmit antennas;

receiving feedback from the receiver that identifies the subset of antenna configurations; and, generating channel codebook entries corresponding to the subset of antenna configurations; and, transmitting data from the transmitter to the receiver by using the channel codebook to select a sequence of antenna configurations from the subset of antenna configurations based on the data to be transmitted, and transmitting symbols using the selected sequence of antenna configurations.

2. The method of claim 1 wherein the transmitted symbols are selected from a source codebook.

3. The method of claim 2 wherein the source codebook includes a plurality of constellation points.

4. The method of claim 2 wherein a selection of a source codeword from the source codebook is dependent on a selected channel codeword from the channel codebook.

5. The method of claim 2 wherein the source codebook includes codewords corresponding to constellation points arranged in a plurality of shells.

6. The method of claim 5 wherein constellation points within each shell of the plurality of shells is selected with equal probability.

7. The method of claim 5 wherein each shell of the plurality of shells is selected with different probabilities.

8. The method of claim 1 wherein the received feedback includes indices of the subset of antenna configurations.

9. The method of claim 1 wherein the feedback includes a scale factor for some of the antenna configurations in the subset to increase a transmit power when the corresponding antenna configuration is used.

10. The method of claim 1 wherein the feedback is received after each symbol of the sequence of symbols is transmitted.

11. The method of claim 1 wherein the propagation environment is changed through changing the radio frequency characteristics of near-by objects.

12. The method of claim 1, wherein the transmitted symbols are encoded using a source codebook to embed additional data in the RF signal prior to being transmitted from the transmit antenna.

13. The method of claim 12, wherein the source codebook includes selecting magnitude and signs of the in-phase and quadrature components to embed additional data.

14. An apparatus comprising:

a transmitter having a source codebook with a plurality of source codewords and a channel codebook with a plurality of channel codewords, wherein each channel codeword corresponds to a respective antenna configuration from a plurality of antenna configurations, the transmitter configured to use data bits to select a source codeword and to select a channel codeword;

at least one transmit antenna used by the transmitter; and, a plurality of reflectors positioned around the at least one transmit antenna wherein the reflectors are configured to be individually turned on or off according to the selected channel codeword to provide the plurality of antenna configurations.

15. The apparatus of claim 14 wherein each of the plurality of reflectors is of a type selected from the group consisting of a plasma, a semi-conductor with induced charges, a mechanically-positioned reflector, and a Micro-Electro-Mechanical system reflector.

16. The apparatus of claim 14 wherein the plurality of reflectors comprises M reflectors and the transmitter is configured to use an M-bit index number to configure the M reflectors.

17. The apparatus of claim 14 wherein the antenna is configured to have adjustable polarization to provide the plurality of antenna configurations.

18. A method comprising:

generating a channel codebook by identifying a subset of antenna configurations from a plurality of antenna configurations of an antenna associated with a transmitter by:

transmitting a sequence of symbols from the transmitter to a receiver using the plurality of antenna configurations, wherein each antenna configuration provides a unique transmission characteristic to the receiver;

receiving feedback from the receiver that identifies the subset of antenna configurations; and, generating channel codebook entries corresponding to the subset of antenna configurations; and, transmitting data from the transmitter to the receiver using the channel codebook;

wherein the antenna configurations are generated by changing the propagation environment around the transmit antennas, and wherein M reflectors are positioned around the transmit antenna and the M reflectors are individually turned on and off to provide $2^M$ antenna configurations.

19. The method of claim 18 wherein the antenna configurations are selected using an M-bit index number.

20. The method of claim 18 wherein the reflectors are of a type selected from the group consisting of a plasma, a semi-conductor with induced charges, a mechanically-positioned reflector, and a Micro-Electro-Mechanical system reflector.

* * * * *